United States Patent Office 2,870,123
Patented Jan. 20, 1959

2,870,123

POLYMERIC AMINONITRILES

George L. Wesp, Englewood, Ohio, assignor to Monsanto Chemical Company, St. Louis, Mo., a corporation of Delaware No Drawing. Application December 22, 1954
Serial No. 477,110

12 Claims. (Cl. 260—72)

This invention relates to new condensation-type polymers and methods of preparing same. In some of its aspects the invention provides polymeric aminonitriles. In other aspects the invention provides new reactants for forming polymers, and new polymer-forming reactions. In other aspects the invention provides high molecular weight condensation polymers which are readily made water-soluble and which are active bactericides and viricides. The invention in other aspects makes possible the production of polymeric α-amino acids and amides.

In accordance with this invention in preferred embodiments, a di-primary amine, a dialdehyde, and hydrogen cyanide (HCN) are inter-reacted to produce a polymeric aminonitrile. By "di-primary amine" I mean a diamine in which both amine groups are primary, i. e., are —$NH_2$. A preferred procedure involves forming an anhydrous mixture of such a diamine and more than 2 mols HCN per mol of said diamine, gradually adding to said anhydrous mixture one mol of an anhydrous dialdehyde per mol of said diamine, and recovering a resulting polymeric aminonitrile. By way of example, p-phenylene diamine, glutaraldehyde, and HCN are reacted to form a corresponding polymeric aminonitrile.

Suitable reactants and the course of the reaction can be represented as follows:

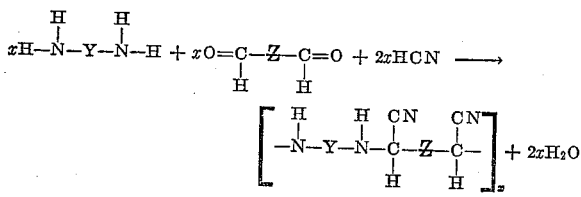

wherein Y comprises a chain of at least 3 atoms at least the majority of which and the terminal members of which are carbon atoms, and Z is a single bond joining the carbon atoms to which it is attached or is a divalent organic radical attached to each of said C atoms by a carbon atom in said radical and comprises at least one carbon atom.

The preferred diamine reactants are di-primary amines having the two primary amine groups separated by at least three intervening atoms. In general any of the di-primary amines which have heretofore been taught in the art for use in condensation polymerization reactions, as with dicarboxylic acids to form superpolyamides, or with carbon disulfide or its derivatives to form polythioureas, can be employed in the present reaction. Thus, the invention is generically applicable to the use of diamines in which both amine groups are primary, including aliphatic, aromatic, alicyclic, and heterocyclic di-primary amines, which may be either saturated or unsaturated. By way of example, but not limitation, there can be mentioned as suitable diamines: tetramethylenediamine, pentamethylenediamine, m-phenylene-diamine, p-phenylene-diamine, benzidine, m-toluylenediamines, 2,5-dimethyl- 1,6 - diaminohexane, 1,4 - diaminocyclohexane, 1,10-diaminodecane, triglycoldiamine (i. e., $H_2NCH_2CH_2OCH_2CH_2OCH_2CH_2NH_2$)

thiodiglycoldiamine (i. e., $H_2NCH_2CH_2SCH_2CH_2NH_2$), 1,2-bis-(3-aminopropoxy)ethane (i. e., $NH_2$—$CH_2$—$CH_2$—$CH_2$—O—
$CH_2$—$CH_2$—O—$CH_2$—$CH_2$—$CH_2NH_2$)

methyl-bis(3-aminopropyl)amine (i. e., $H_2N$—$CH_2$—$CH_2$—$CH_2$—$\underset{\underset{CH_3}{|}}{N}$—$CH_2$—$CH_2$—$CH_2$—$NH_2$)

The diamine, however, should have a chain of at least three atoms between the amino nitrogens, and preferably at least four atoms when the chain is an open chain.

Similarly, the invention is generic to the use of organic dialdehydes. Dialdehydes in general are rather unstable materials, subject to self-polymerization, and therefore one will ordinarily prefer to employ a dialdehyde of reasonable stability, i. e., one which can be isolated and stored before use if necessary. However, it will ordinarily be desirable to employ freshly prepared or at least freshly distilled dialdehyde for the reaction. Suitable dialdehydes include, by way of example: glyoxal, terephthaldehyde, glutaraldehyde, 3 - oxaglutaraldehyde, 3-methyl glutaraldehyde.

The inter-reaction of a dialdehyde, a diamine (primary amino groups) and HCN gives a linear condensation polymer. It is not outside the scope of the invention in its broadest aspects to employ polyamines containing more than two primary amine groups, for example, a triamine such as tris(2-aminoethyl)amine. Since such materials form highly cross-linked polymers, they are ordinarily much less preferred than the di-functional reactants. Small amounts of tri- or tetramine, or of a trialdehyde, etc., can be employed, if desired, for the purpose of cross-linking the generally linear polymer obtained from reactants which comprise largely the di-functional amines and aldehydes with only small amounts of the higher amines or aldehydes.

The condensations of the present invention are preferably effected in anhydrous reaction mixtures. The presence of water is not excluded from the broad scope of the invention, but it tends to form tarry masses. It is likewise preferred to use the aldehydes in their free form. However, their complexed forms, for example the addition product of a dialdehyde with sodium bisulfite, can be used but this requires the presence of water to liberate the free dialdehyde in the reaction mixture and thus has the disadvantages mentioned above with respect to the presence of water. It is usually quite desirable to have present in the reaction mixture a liquid which will remain unreacted at the end of the condensation reaction so as to provide the condensation polymer in the form of a suspension or slurry. This liquid can be excess anhydrous HCN, i. e., HCN in an amount greater than the two mols of HCN per mol of dialdehyde which actually enter into the polymer-forming reaction. Usually, however, for the sake of convenience and economy, the amount of excess HCN is limited to from 0.1 to 2 mols per mol of dialdehyde reactant, and the desired unreacted liquid is provided in the form of an organic liquid inert to the reactants and products the conditions of the reaction, e. g., diethyl ether, chloroform, Cellosolve (i. e., monoethyl ether of ethylene glycol), other Cellosolve ethers, such as butyl Cellosolve (i. e., monobutyl ether of ethylene glycol), or dibutyl Cellosolve (i. e., dibutyl ether of ethylene glycol), Carbitols such as butyl Carbitol (i. e., monobutyl ether or diethylene glycol).

Due to the volatile nature of HCN and the reactivity of the the reactants, especially the dialdehydes, it is preferred to initiate the reaction in the cold, i. e., at temperatures in the neighborhood of 0° C. As indicated hereinbefore, it is much preferred to prepare initially a mixture of the required amount of di-primary amine and HCN plus any excess HCN if such is to be used, and then to add slowly to this mixture, maintained below normal room temperature, i. e., below 20° C., the dialdehyde until an amount of dialdehyde equal to the number of mols of diamine has been added. The reaction mixture can then be warmed to room temperature and even heated, if desired, to moderate temperatures such as up to 50 to 80° C. or somewhat higher. The reaction time will be dependent to some extent on the reaction temperature, and the particular diamine and dialdehyde. However, reaction times of ½ hour to 24 hours are ordinarily adequate. The final reaction mixture, comprising a suspension of the polymer, can then be treated by any suitable means, for example, filtration of the polymer, evaporation of solven and water formed in the reaction, and the like, in order to recover the polymer in useful form.

The molecular weight of the product can be controlled in accordance with principles that are generally understood to the condensation polymer chemist. Thus, polymers of quite high molecular weight can be obtained only if the amount of di-primary amine, dialdehyde and HCN are strictly the stoichiometric amounts with the exception that excess HCN is permissible. The polymers are generally water-insoluble, but can easily be made water-soluble by reaction with acid or with quaternizing agents, e. g., to form the corresponding hydrochloride, sulfate, organic sulfonate such as the paratoluene sulfonate, or the quaternary halides for example by reaction with methyl chloride, in each case using one molecule of the acid or quaternizing agent per amino nitrogen atom in the polymer. However, water solubility can often be conferred by employing considerable less than the stoichiometric quantity of the acid or quaternizing agent. The polymers are active bactericides and viricides. Thus, the polymer prepared by reacting paraphenylenediamine, glutaraldehyde and HCN, can be converted to its hydrochloride and the resultant water-soluble hydrochloride of the polymer is lethal to *Staphylococcus aureus* at low concentrations.

The polymers of the present invention are particularly useful in imparting dyeability to polyacrylonitrile. Thus, the polymers of the invention can be added in the amount of a few weight per cent, say 2 to 10 per cent, to any of the now well-known fiber-forming acrylonitrile polymers in which acrylonitrile comprises from 80 to 100 percent of the polymer, and the resulting admixture spun by known methods into fibers. The polymers of this invention readily accept acid dyes and thus impart dyeability to the polyacrylonitrile fibers.

The polymers of this invention can be cross-linked, as by reaction with formaldehyde, di-acid chlorides, dicarboxylic acids such as adipic acid, and other well-known cross-linking agents, preferably in small amounts, to give insoluble anion exchange resins.

The invention provides polymeric nitriles containing α-amino groups. Both the nitrile groups and the amino groups are amenable to further reaction. Thus, part or all of the nitrile groups can be hydrolyzed, for example by heating the polymer with aqueous mineral acids, e. g., hydrochloric, sulfuric, resulting in polymeric α-amino acids and/or polymeric α-amino amides.

The following example illustrates one way of carrying out the invention employing a particular diamine and a particular dialdehyde. The diamine and dialdehyde, the solvents, the purification methods, and the like, are to be taken as exemplary and variations therefrom can be made without departing from the invention in its broadest scope.

*Example* p-Phenylenediamine (0.20 mol recrystallized from dilute aqueous sodium hydrocultite solution) was dispersed in 150 ml. diethyl ether, cooled to 3° C. and treated with 0.437 mol anhydrous hydrogen cyanide (freshly prepared from sodium cyanide + sulfuric acid and distilled through calcium chloride to remove moisture), rinsed in 25 ml. ether. The resulting slurry was stirred at 3° C. and treated with 0.20 mol monomeric glutaraldehyde in 25 ml. ether, added at the rate of 5 ml./3 min. The mixture then stood 20 hours and the light pink solids changed to a tan color. These were removed, rinsed with ether and vacuum dried at 55° C. There was recovered 40.4 g. light tan amorphous solid (A), 89.3 percent of theory for $C_{13}H_{14}N_4$.

A solution of 5 g. of (A) in 15 ml. of dimethylacetamide was poured into 300 ml. 30% alcohol( well agitated) and the flocculent precipitate was removed, washed with water and alcohol and vacuum dried at 55° C. prior to analysis.

| Analysis | Percent C | Percent H | Percent N |
|---|---|---|---|
| A, as is | 67.79 | 6.29 | 20.38 |
| A, purified | 67.54 | 6.32 | 20.56 |
| Theory for $C_{13}H_{14}N_4$ | 69.00 | 6.24 | 24.77 |

This analysis shows that the product approximates the polyamino-nitrile structure.

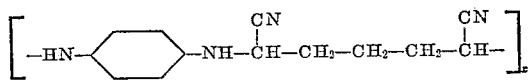

Solid (A) was soluble in acetone, dimethylacetamide and dioxane. Evaporation of solutions to dryness gave clear, but somewhat brittle, continuous films. The polymer had little or no solubility in benzene, chloroform, ethyl acetate, acetic acid, or water. It dissolved in hot, but not cold, acetic anhydride, accompanied by discoloration.

On a melting point block, solid (A) began to stick at 75–80° C., was rubbery at 90° C., and could be drawn to short, brittle fibers at about 110–115° C.

While the invention has been described with particular reference to various preferred embodiments, it will be appreciated that variations from the details given herein can be effected without departing from the invention in its broadest aspects.

I claim:

1. A polymeric aminonitrile characterized by containing in the polymer chain recurring units having the formula

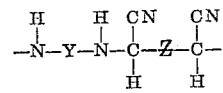

wherein Y comprises a chain of at least 3 atoms at least the majority of which and the terminal members of which are carbon atoms, and -Z- is selected from the group consisting of a single bond joining the C atoms to which it is attached and a divalent hydrocarbon radical.

2. A polymeric aminonitrile of claim 1 wherein Y is selected from the group consisting of polymethylene, hydrocarbon-substituted polymethylene, phenylene, and hydrocarbon-substituted phenylene radicals.

3. A polymeric aminonitrile of claim 1 wherein -Z- is selected from the group consisting of polymethylene and phenylene radicals.

4. A process which comprises forming an anhydrous mixture of a di-primary amine and more than two mols HCN per mol of said di-primary amine, gradually adding to said anhydrous mixture one mol of an anhydrous dialdehyde per mol of said di-primary amine, and recovering a resulting polymeric aminonitrile, said di-primary amine having the two primary amine groups separated by a chain of at least 3 atoms at least the majority of which are carbon atoms, and said dialdehyde being selected from the group consisting of glyoxal and hydrocarbon dialdehydes.

5. A process which comprises forming an anhydrous mixture of (a) a diamine having the formula

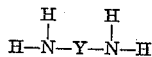

wherein Y comprises a chain of at least 3 atoms at least the majority of which and the terminal members of which are carbon atoms and (b) at least two mols HCN per mol of (a), interreacting by condensation polymerization said anhydrous mixture with one mol of an anhydrous dialdehyde per mol of (a), said dialdehyde having the formula

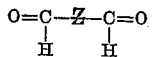

wherein -Z- is selected from the group consisting of a single bond joining the C atoms to which it is attached and a divalent hydrocarbon radical, and recovering a resulting polymeric aminonitrile containing in the polymer chain recurring units having the formula

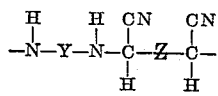

wherein Y and -Z- are as aforesaid.

6. Process of claim 5 wherein said inter-reacting is effected in the presence of an organic solvent inert to the reactants and products.

7. A process which comprises inter-reacting by condensation polymerization in the absence of added water, p-phenylene diamine, glutaraldehyde, and HCN to form a corresponding polymeric aminonitrile.

8. A polymeric aminonitrile of claim 1 wherein Y is p-phenylene and wherein -Z- is —$CH_2$—$CH_2$—$CH_2$—.

9. A polymeric aminonitrile of claim 1 wherein -Z- is p-phenylene.

10. A process which comprises inter-reacting by condensation polymerization in the absence of added water, a di-primary amine, a dialdehyde, and HCN to produce a polymeric aminonitrile, said di-primary amine having the two primary amine groups separated by a chain of at least 3 atoms at least the majority of which are carbon atoms, and said dialdehyde being selected from the group consisting of glyoxal and hydrocarbon dialdehydes.

11. A process which comprises inter-reacting by condensation polymerization in the absence of added water, approximately stoichiometric proportions of a di-primary amine and a dialdehyde and at least approximately the stoichiometric proportion of HCN to produce a polymeric aminonitrile, said di-primary amine having the two primary amine groups separated by a chain of at least 3 atoms at least the majority of which are carbon atoms, and said dialdehyde being selected from the group consisting of glyoxal and hydrocarbon dialdehydes.

12. A process which comprises inter-reacting by condensation polymerization in the absence of added water, approximately stoichiometric proportions of p-phenylene diamine and glutaraldehyde and at least approximately the stoichiometric proportion of HCN to form a corresponding polymeric aminonitrile.

References Cited in the file of this patent

UNITED STATES PATENTS

| | | |
|---|---|---|
| 2,228,271 | Jacobson et al. | Jan. 14, 1941 |
| 2,387,735 | Bersworth | Oct. 30, 1945 |
| 2,653,143 | Benneville | Sept. 22, 1953 |

FOREIGN PATENTS

| | | |
|---|---|---|
| 638,071 | Germany | Nov. 9, 1936 |